Jan. 11, 1927.  
A. B. SIMON  
CONVERTED MOTOR POWER PLANT  
Filed Nov. 14, 1925

1,614,402

Inventor  
A. B. Simon  
By Lacey & Lacey, Attorneys

Jan. 11, 1927.
A. B. SIMON
1,614,402
CONVERTED MOTOR POWER PLANT
Filed Nov. 14, 1925  2 Sheets-Sheet 2
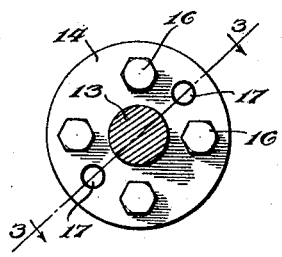
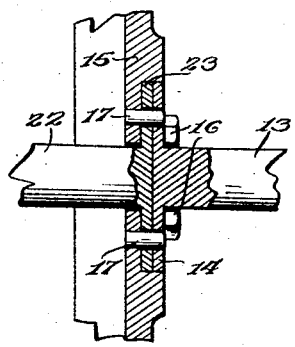
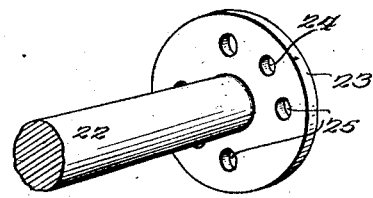
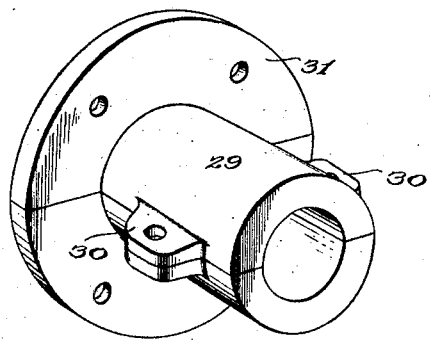
Inventor
A. B. Simon
By Lacey & Lacey, Attorneys Patented Jan. 11, 1927.

1,614,402

UNITED STATES PATENT OFFICE.

ALFRED B. SIMON, OF SELAH, WASHINGTON.

CONVERTED MOTOR-POWER PLANT.

Application filed November 14, 1925. Serial No. 69,055.

This invention relates to an improved converted motor power plant and seeks, among other objects, to provide means whereby a Ford automobile engine may, when removed from the vehicle chassis, be utilized as a power plant.

The invention seeks, as a further object, to provide means whereby a Ford engine may be cheaply converted into a power plant especially suitable for farm usage.

And the invention seeks, as a still further object, to provide a power take-off which may be readily installed or attached to a Ford engine for converting the engine into an efficient power plant.

Other and incidental objects will appear hereinafter.

In the accompanying drawings:

Figure 2 is a detail sectional view on the line 2—2 of Figure 1, looking in the direction indicated by the arrows.

Figure 3 is a detail sectional view on the line 3—3 of Figure 2, looking in the direction indicated by the arrows.

Figure 4 is a detail perspective view showing the flange at the inner end of the drive shaft.

Figure 5 is a detail perspective view of the bearing employed.

Figure 1:
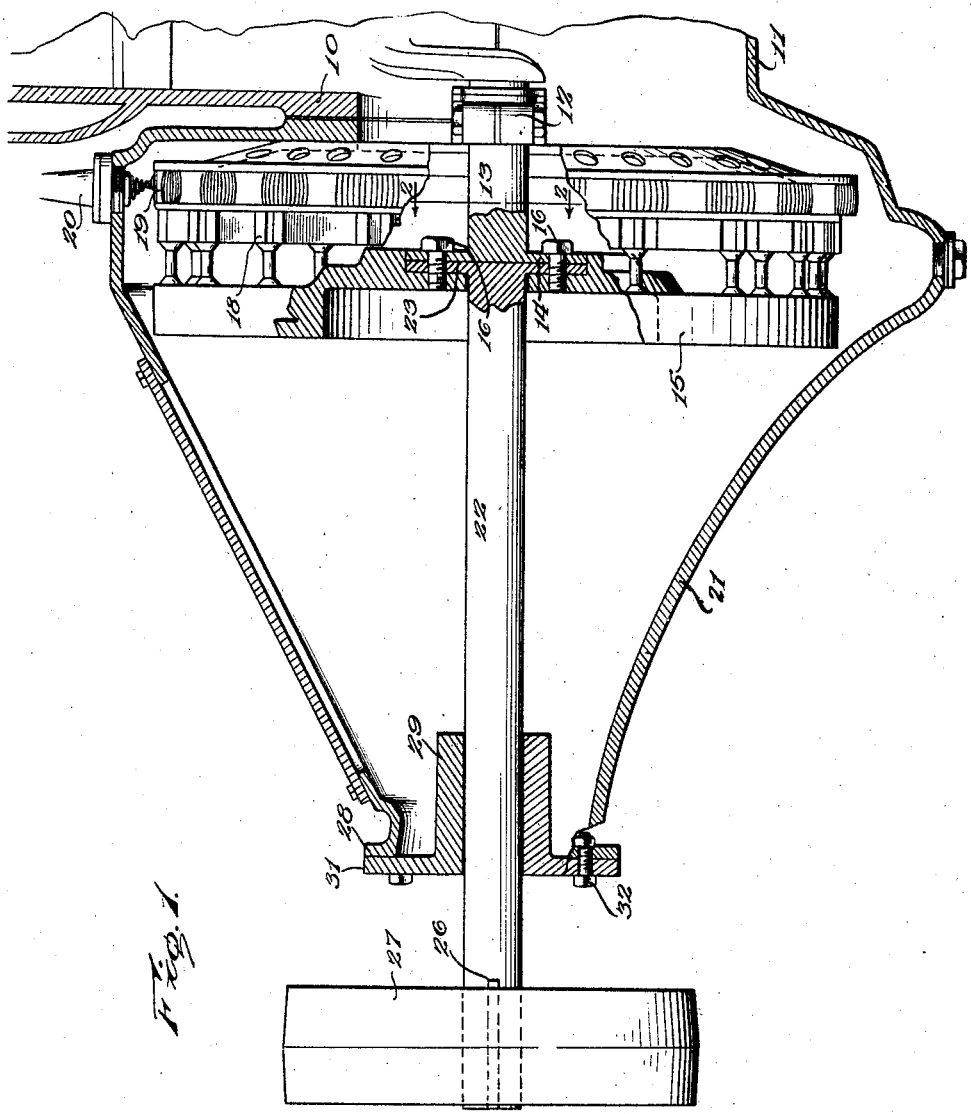
Figure 1 is a sectional view showing the manner in which the drive shaft employed is installed.

In accordance with the present invention, a Ford automobile engine is made available for use in a power plant especially adapted for farm work. As is well known, the work of a farm often requires a power unit but difficulty has heretofore been experienced in that repair parts cannot be conveniently had for the power units furnished while the expense of such units has been considerable. In contrast, repair parts for a Ford engine may, due to the wide distribution of service stations, be conveniently and easily obtained while the engine of a vehicle which has been in service for a considerable length of time may be cheaply purchased. Such an engine, while possibly not suitable for further use in the vehicle is, nevertheless, entirely available for a power plant as contemplated by the present invention. The cost of such an engine is often less than a standard power unit for a like purpose while the power plant utilizing the engine in accordance with the present invention, is often more efficient. The present invention, therefore, seeks to utilize Ford engines which would otherwise be discarded and, at the same time, provide a power plant, the spare parts for which may be cheaply and, if necessary, quickly obtained. In Figure 1 of the drawings, I have shown a Ford engine block at 10 and the crank case at 11. The rear main bearing of the engine is indicated at 12 and the crank shaft at 13, which shaft is provided at its rear end with the usual flange 14. The flywheel is indicated at 15. Normally, the flywheel abuts a transmission shaft flange which is disposed between the flywheel and the flange 14 of the crank shaft and is secured to both flanges by cap bolts 16 while, as shown in Fig. 3, the flywheel is provided with centering studs 17 to engage through said flanges. The usual magnet assembly of the magneto of the engine is indicated at 18, which assembly is carried by the flywheel, while the coil assembly of the magneto is indicated at 19 and the magneto contact post at 20. The flywheel and magneto are, as usual, housed by the transmission casing 21 of the engine, all of this structure, as thus far described, being in accordance with standard practice.

In carrying the invention into effect, the engine is removed from the vehicle chassis and mounted upon any suitable bed or base. The transmission gears, the transmission drums, and the clutch are then removed from the transmission casing 21 while the usual transmission shaft is disconnected from the flywheel and also removed. In lieu of said shaft, I provide a drive shaft 22. The drive shaft 22 is arranged to extend through the usual axial opening of the flywheel 15, and formed on said shaft at its forward end is an annular flange 23 seating flat against the forward face of the flywheel hub abutting the flange 14 of the crank shaft 13. As shown in Figure 4, the flange 23 is provided with openings 24 to accommodate the centering studs 17 of the flywheel and is also provided with other openings 25 to accommodate the cap bolts 16 so that said bolts may be inserted through the flange 14 of the crank shaft and through the flange 23 of the drive shaft and screwed into the hub of the flywheel for rigidly connecting the drive shaft and the flywheel with the crank shaft. At its rear end, the shaft 22 is provided with a keyway 26 so that a pulley, gear or sprocket may be fixed to the shaft. In the drawings, I have typically illustrated a conventional driving element at 27 and, of course, power is taken from the shaft 22 through the agency of said element.

The usual flange at the rear end of the transmission casing 21 is indicated at 28. Normally, the front universal ball cap is bolted to this flange but, in accordance with the present invention, the cap is removed and in lieu thereof I provide a bearing 29 which journals the shaft 22. As shown in detail in Figure 5, this bearing is formed of mating halves which are provided with lateral ears 30 to accommodate suitable bolts securing the halves of the bearing together, and formed on the rear end of said bearing is a circular flange 31. The flange 31 is seated flat against the flange 28 of the transmission casing 21 and engaged through said flanges are bolts 32 rigidly connecting the bearing with the transmission casing. Thus, the bearing will not only serve to journal the rear end portion of the drive shaft 22 but also provides a closure for the transmission casing so that dust and dirt will be excluded therefrom.

As will now be seen, in view of the foregoing, the drive shaft 22 and bearing 29 may be readily installed for converting the engine into a power plant. The drive shaft will, of course, be turned at crank shaft speed and when the engine is operated, power may be taken from said shaft at the driving element 27 and readily utilized for the purpose desired. Furthermore, the arrangement is such that the operativeness of the engine magneto is not affected, so that the ignition of the engine will be supplied by said magneto in the usual manner. Should the bearing 29 become worn, said bearing may be readily removed and a new bearing substituted in lieu thereof while, should the efficiency of the drive shaft 22 become impaired, said shaft may also be readily removed and renewed.

Having thus described the invention, what I claim is:

The combination with a motor vehicle engine including a crank shaft provided at its rear end with a flange, a flywheel, and a transmission casing, the flywheel and transmission casing being alined axially with the crank shaft, of a drive shaft extending axially through the flywheel in substitution for the transmission shaft and transmission gearing and provided at its forward end with a flange abutting the flywheel at one side and the flange of the crank shaft at the opposite side, means extending through said flanges and engaged with the flywheel to connect the drive shaft with the crank shaft and the flywheel with both shafts, a straight bearing secured to the transmission casing at its rear end and extending axially inwardly through said end for journaling the rear end portion of said drive shaft, the drive shaft projecting through and beyond said bearing at the rear of the transmission casing, and a drive element carried by the projecting portion of the drive shaft to provide a power take-off.

In testimony whereof I affix my signature.

ALFRED B. SIMON. [L. S.]